US008254534B2

(12) United States Patent
Comerford

(10) Patent No.: US 8,254,534 B2
(45) Date of Patent: *Aug. 28, 2012

(54) METHOD AND APPARATUS FOR AUTOMATIC TELEPHONE MENU NAVIGATION

(75) Inventor: Liam D. Comerford, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 1337 days.

This patent is subject to a terminal disclaimer.

(21) Appl. No.: 11/766,410

(22) Filed: Jun. 21, 2007

(65) Prior Publication Data

US 2007/0248218 A1 Oct. 25, 2007

Related U.S. Application Data

(63) Continuation of application No. 10/752,967, filed on Jan. 7, 2004, now Pat. No. 7,317,789.

(51) Int. Cl.
 *H04M 11/00* (2006.01)
(52) U.S. Cl. ...................................... 379/88.18; 379/85
(58) Field of Classification Search .... 379/88.01–88.27, 379/85
 See application file for complete search history.

(56) References Cited

U.S. PATENT DOCUMENTS

| 5,822,405 | A | * | 10/1998 | Astarabadi ................. 379/88.04 |
| 5,999,612 | A | * | 12/1999 | Dunn et al. .............. 379/212.01 |
| 6,016,336 | A | | 1/2000 | Hanson |
| 6,504,917 | B1 | | 1/2003 | Flint et al. |
| 2001/0014146 | A1 | | 8/2001 | Beyda et al. |
| 2004/0179659 | A1 | * | 9/2004 | Byrne et al. ............... 379/88.18 |

FOREIGN PATENT DOCUMENTS

| EP | 0 827 320 A2 | 3/1998 |
| WO | WO 97/23973 | 7/1997 |

* cited by examiner

*Primary Examiner* — Yuwen Pan
*Assistant Examiner* — Assad Mohammed
(74) *Attorney, Agent, or Firm* — Anne V. Dougherty; Ryan, Mason & Lewis, LLP

(57) ABSTRACT

Principles of the present invention provide techniques for automatically navigating through a telephone menu system. Illustrative techniques of the invention permit a user of a telephone menu system (e.g., IVR system) to record operations needed to navigate to a particular point in a menu tree of the telephone menu system and to either gather information or perform a transaction at that menu point. The information or transaction status may be reported to the user. Part of the act of training may be the association of a command with the navigation operations, after which the automated telephone menu navigation system of the invention will repeat the procedure, in correct synchrony with the telephone menu service, when the user says the command. In addition, the techniques of the invention detect failure or loss of synchronization or changes in the telephone menu.

15 Claims, 4 Drawing Sheets

METHOD AND APPARATUS FOR AUTOMATIC TELEPHONE MENU NAVIGATION

CROSS-REFERENCE TO RELATED APPLICATION

This application is a continuation of U.S. application Ser. No. 10/752,967, filed on Jan. 7, 2004, now U.S. Pat. No. 7,317,789 the disclosure of which is incorporated by reference herein.

FIELD OF THE INVENTION

The present invention relates to telephone menu systems and, more particularly, to techniques for automatically navigating telephone menu systems.

BACKGROUND OF THE INVENTION

Telephone menu systems or interactive voice response (IVR) systems are commonplace, yet tend to be widely disliked. In the routine operation of a telephone menu system, a user attempting to obtain a service is lead by instruction prompts to push telephone buttons or speak words to select among choices. Depending on the state of this instruction-response navigation process, the next state to be selected might represent the next menu of choices, an actual service, or a form-filling dialog directed at obtaining a service.

Telephone menu systems do not meet at least one essential requirement for good user interfaces. They do not offer techniques by which an experienced or expert user can perform the task with less effort than a novice. That is, the interface is aimed at the first time user and not the repeat user.

SUMMARY OF THE INVENTION

Principles of the present invention provide techniques for automatically navigating through a telephone menu system.

For example, in one aspect of the invention, a technique for use in automating access to one or more services accessible through a communications system (e.g., telephone menu system or interactive voice response system) includes the following steps/operations. The communications system is connected to. Then, one or more actions associated with a user and one or more actions associated with the communications system are recorded such that at least a portion of the one or more actions associated with the user and the one or more actions associated with the communications system are automatically performable or recognizable, respectively, when the communications system is subsequently connected to. It is to be appreciated that the term "recognize," as used in accordance with at least this aspect of the invention, is not intended to be limited speech recognition, rather, it may refer to the more general concept of an action being "understood."

These and other objects, features and advantages of the present invention will become apparent from the following detailed description of illustrative embodiments thereof which is to be read in connection with the accompanying drawings.

DETAILED DESCRIPTION OF PREFERRED EMBODIMENTS

Figure 1:
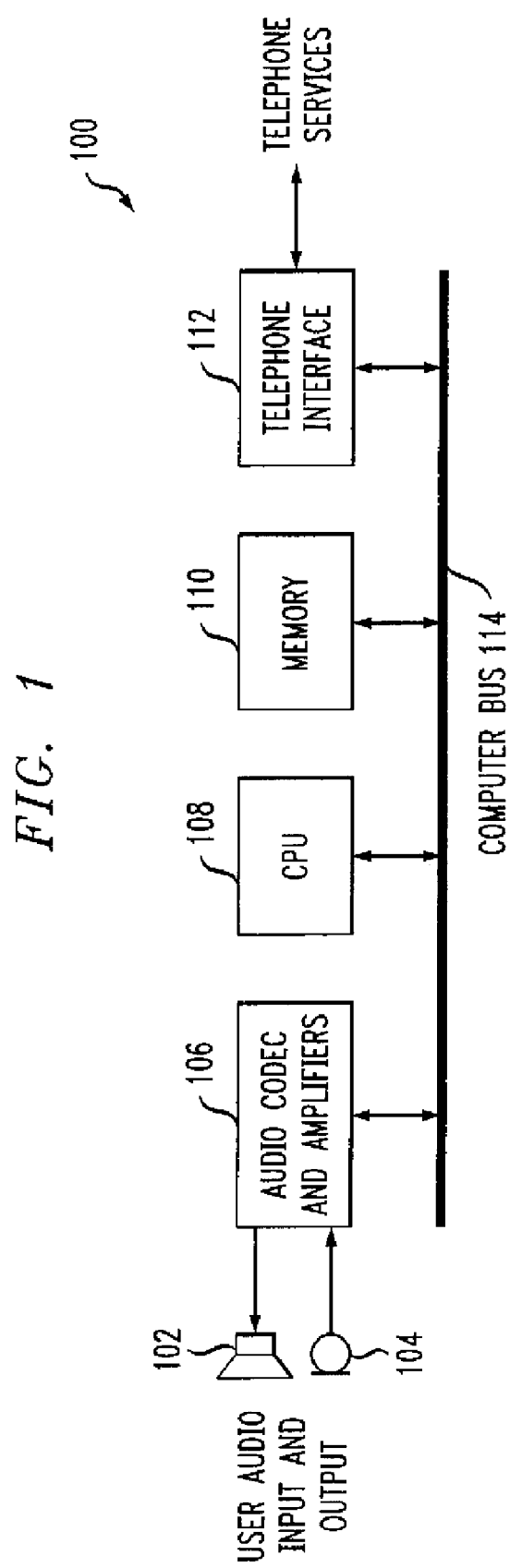
FIG. 1 is a block diagram illustrating an automated telephone menu navigation system according to an embodiment of the present invention.

It is to be understood that while the present invention will be described below in the context of a particular computing system environment and an illustrative telephone-based communications system, the invention is not so limited. Rather, the invention is more generally applicable to any computing system environment and any communications system in which it would be desirable to automate navigation of information and/or services associated with the communications system.

As will be explained in detail below, illustrative techniques of the invention permit a user of a telephone menu system to record operations needed to navigate to a particular point in a menu tree of the telephone menu system and to either gather information or perform a transaction at that menu point. The information or transaction status may be reported to the user. Part of the act of training may be the association of a vocalized command with the navigation operations so that, for example, the user might say "Listen while I get my Credit Union account balance," after which the automated telephone menu navigation system of the invention will repeat the procedure, in correct synchrony with the telephone menu service, when the user says "Get my Credit Union Balance." In addition, the techniques of the invention detect failure or loss of synchronization or changes in the telephone menu.

In accordance with the invention, it is realized that if a transaction with a telephone menu system is analyzed, the transaction can be seen to consist of a set including an initiation, one or more structurally similar units of transaction, and a completion:

<initiation><transaction units><completion>

The case that the user is obtaining information from the service is shown below as an example. Other transactions are essentially similar in form.

"Initiation," according to the invention, may take the form of a command that includes a record command, and naming command, and a dial up typical of normal phone menu usage:

<command to record sequence><optional acknowledgement><command to name the sequence><optional acknowledgement><dialup DTMF><connection establishment sounds>

"Transaction units," according to the invention, may take the form:

<prompt spoken by IVR system><response provided by the user>

A prompt may be an instruction to the user or information requested by the user or a confirmation to the user. A response may be dual tone multi-frequency (DTMF) generated by a user button press or user generated utterances or silence generated by the user.

"Completion," according to the invention, may take the form:

<prompt spoken by IVR system><no response provided by the user or DTMF generated by the user or keyword spoken by the user>

In which case, at the time an automated telephone menu navigation system of the invention repeats the access sequence, the last response is replayed to the user.

Thus, in accordance with illustrative principles of the invention, a specific transaction between a user and a telephone menu system (e.g., IVR) may be recorded as data by an automated telephone menu navigation system capable of speech recording, recording playback, speech decoding, and recognizing and recording (or generating) DTMF. The automated navigation system may determine which party (the IVR or the user) is the source for a given utterance or sound from its observations of a transaction. For example, all DTMF is generated by user actions. Speech comes from the user if its source is a local microphone. All other speech comes from the IVR. Other sorting clues may be used.

Further, in accordance with illustrative principles of the invention, once a dialog has been observed and the origin of the signals sorted into "user" and "IVR," the transaction can be replayed by providing the sequentially correct user input in response to the end of each IVR input. Further, breakdown in the dialog synchronization can be detected by the failure of the IVR input to match the expectation embodied in the recording of the sample transaction.

Navigation within a menu may be accomplished since an automated navigation system of the invention possesses information about the menu state, or, may be taught the sequence necessary to return to a known state.

Referring initially to FIG. 1, a block diagram illustrates an automated telephone menu navigation system according to an embodiment of the present invention. As shown, automated telephone menu navigation system 100 is a computing system including a speaker 102, a microphone 104, an audio coder/decoder (CODEC) and amplifiers 106, a central processing unit (CPU) 108, memory 110, a telephone interface 112, and a computer bus 114 coupling CODEC 106, CPU 108, memory 110 and telephone interface 112.

It is to be appreciated that the individual components of system 100 may be implemented on one such computing system or on more than one such computing system. In the case of an implementation on a distributed system, the individual computing systems and/or devices may be connected via a suitable network, e.g., the Internet or World Wide Web. However, the system may be realized via private or local networks. The invention is not limited to any particular network.

It is to be further appreciated that the term "CPU" as used herein is intended to include any processor, processing device and/or other processing circuitry. It is also to be understood that the term "CPU" may refer to more than one processing mechanism and that various elements associated with a processing mechanism may be shared by other processing mechanisms. The term "memory" as used herein is intended to include memory associated with a CPU, such as, for example, RAM, ROM, a fixed memory device (e.g., hard drive), a removable memory device (e.g., diskette), flash memory, etc. Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU. In addition, while not expressly shown, it is to be appreciated that system 100 may also include a display or some other data output device (in addition to speaker 102) for presenting results associated with processing unit 106, and a keyboard (or keypad) or some other data entry device (in addition to microphone 104) for entering data to be used by the processing unit.

Automated telephone menu navigation system 100 provides voice recognition, audio recording and audio recording playback capabilities. Such capabilities may be realized via CODEC 106 (which processes audio signals captured by microphone 104 and generates audio signals for output by speaker 102) and via speech recognition software and audio recording/playback software (stored in memory 110 and executed by CPU 108). Since CODECs, speech recognition software, audio recording/playback software, and their respective operations are well known to those ordinarily skilled in the speech signal processing art, such components and their operations will not be described in further detail herein. It is also to be appreciated that these capabilities may be local (e.g., available on one or more computing systems collocated with the user) and/or remote (e.g., available on one or more computing systems not collocated with the user) as long as the services provided by those capabilities are available to process the audio produced by the user.

In addition, telephone interface 112 of automated telephone menu navigation system 100 provides telephone dialing, DTMF, and telephone network connection capabilities.

The above-described components and capabilities may be incorporated into a cell phone, a personal digital assistant (PDA), a personal computer, a car phone or any other telephony apparatus having suitable computing power and memory.

In the normal course of operations of an automated telephone menu navigation system according to the invention, the user may indicate to the system by way of button presses, voice commands or other such input, that the user wishes to execute the training phase of the inventive methodology. This indication causes a software program stored in a non-volatile portion of the system's memory to be loaded and started. On completion of its initialization, this software component indicates its readiness by any conventional user interface mechanism such as a tone, a spoken message or an on-screen text message.

The user may then provide (e.g., by speech or keyboard input) a name for the service access method that will be taught. For example, if the user is about to obtain his bank balance via an IVR system associated with a bank, the user might type "get bank balance." In the future, the user need only provide that name/phrase (i.e., "get bank balance") to the access method execution software and this will be sufficient to obtain the bank balance since the chore of dialing and navigating the menu will be performed by the software. In some cases, the user may wish to reach a point in a telephone menu where the user wishes to enter variable information. For example, the user may wish to move money from one account to another. In this case, the training phase can be used to create an access method that brings the service to the state in which it begins to request variable information such as the banks and monetary quantities.

The user next operates the features of the telephone interface of the system by, for example, "pressing" on-screen buttons or operating real physical buttons in order to dial a menu-based telephone service. The number called is recorded by the training-phase software and stored in memory.

After some period, following zero to many rings, the service picks up the line and announces itself to the user. This announcement often includes a listing of the button presses the user may make to access services or equivalent words that may be spoken. This announcement is processed by the speech recognition component of the invention in order to convert it into computer text. This text is stored in memory.

Hearing the voice prompt from the service, the user may then press a button or speak a word in order to progress to the next level of the service. This user action is stored in memory.

This repeating sequence of prompt, speech decoding, storage, user response, decoding (if needed), and storage, is repeated until the user receives the desired information or arrives at a prompt which will require different responses each time the service is called. At this point, the user indicates to the system that the training phase is complete, by way of a button press or uttering a key-phrase that is not transmitted to the telephone subsystem. The user may then receive a prompt containing the name of the access method and the fact that it is available for use. The software then causes the individual, sequential elements of the interaction with the telephone menu system to be stored in a "service access method" file.

Having completed at least one training, the user may, in the future, indicate to the system by way of button presses, voice commands or other such input, that the user wishes to execute the operating phase of the inventive methodology. This indication causes a second software program stored in a non-volatile portion of the system's memory to be loaded and started. On completion of its initialization, this software component indicates its readiness by any conventional user interface mechanism such as a spoken message or an on-screen text message, any of which can be used. The software component also indicates the members of the collection of trained access methods. The user selects one, and the system executes the selected access method.

In response to selection, the software first establishes telephone network connection, dials the service using stored DTMF data, and waits for the remote service's initial prompt. This prompt is processed by the speech recognition component of the system, and if the computer text produced by the recognition process is a sufficient match to that recognized during the training phase, the software responds to the prompt in the way the user did during the training session. As long as the service behavior substantially corresponds to the training phase recorded service behavior, the cycle is iterated until the recorded data for that access method is exhausted. At this point, the user has been brought to the desired point in the telephone menu and is receiving the desired information or executing the desired transaction.

In the event that the access script does not receive the responses from the service that are described in the access method data, an error message is provided to the user by any conventional mechanism (e.g., audible message or tone, on-screen message, etc.), and the fact of the failure is added as data to the access method data. This may be used by the software to trigger the suggestion to the user that the method is defective or that the service is changed, and that training should be repeated.

Given the above illustrative overview of the inventive techniques, operation of illustrative training and access (including error detection and reporting) software processes of the invention are described below in the context of FIGS. 2 and 3.

Figure 2:
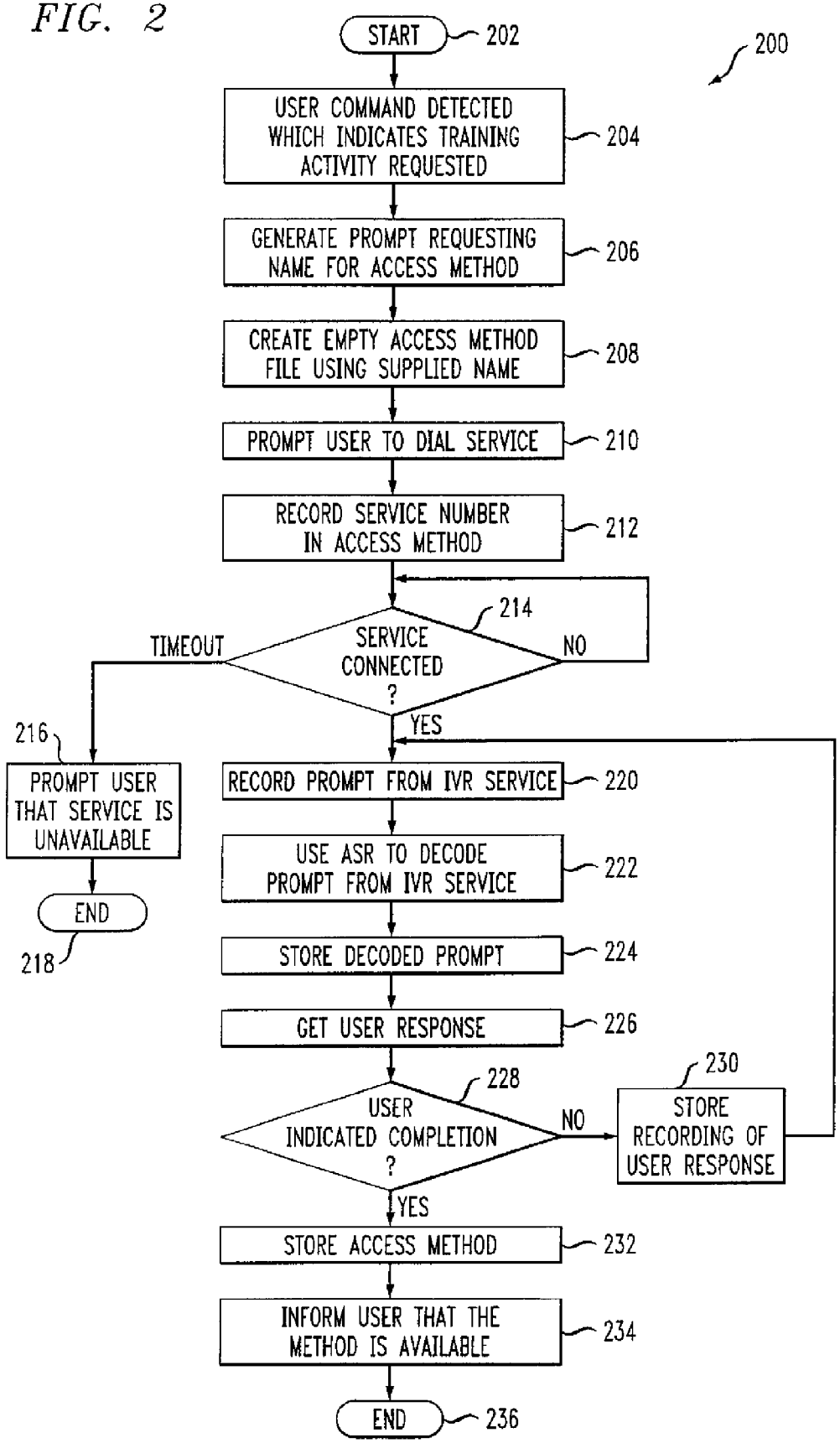
FIG. 2 is a flow diagram illustrating a training process of an automated telephone menu navigation methodology according to an embodiment of the present invention.

Referring now to FIG. 2, a flow diagram illustrates a training process of an automated telephone menu navigation methodology according to an embodiment of the present invention.

Training process 200 begins at block 202. In step 204, the process detects a user command, the command indicating that training activity is requested by the user. In step 206, the process generates a prompt requesting a name for the access method. In step 208, the process creates an empty access method file using the name supplied by the user.

In step 210, the process prompts the user to dial the telephone number of the desired service. In step 212, the service telephone number is recorded in the access method file. In step 214, the process determines whether the user's device has connected to the service. If no, the process iterates step 214 until a connection is made or a timeout period has elapsed. If a timeout is reached, the process prompts the user that the service is unavailable, in step 216. The process would then end at block 218.

If a connection is made, the process records the prompt from the IVR service, in step 220. In step 222, the automatic speech recognition (ASR) component of the system decodes the prompt from the IVR service. The decoded prompt is then stored, in step 224. In step 226, the user response is obtained.

In step 228, the process determines whether the user has indicated completion of the training phase. If not, the process stores the users response, in step 230, and continues to iterate through steps 220 through 228 until, in step 228, the user indicates completion of the training phase. At that point, the access method (including the recorded sequences of prompt, speech decoding, storage, user response, decoding (if needed), and storage) is stored, in step 232. In step 234, the process informs the user that the method is available. The process ends at block 236.

Figure 3:
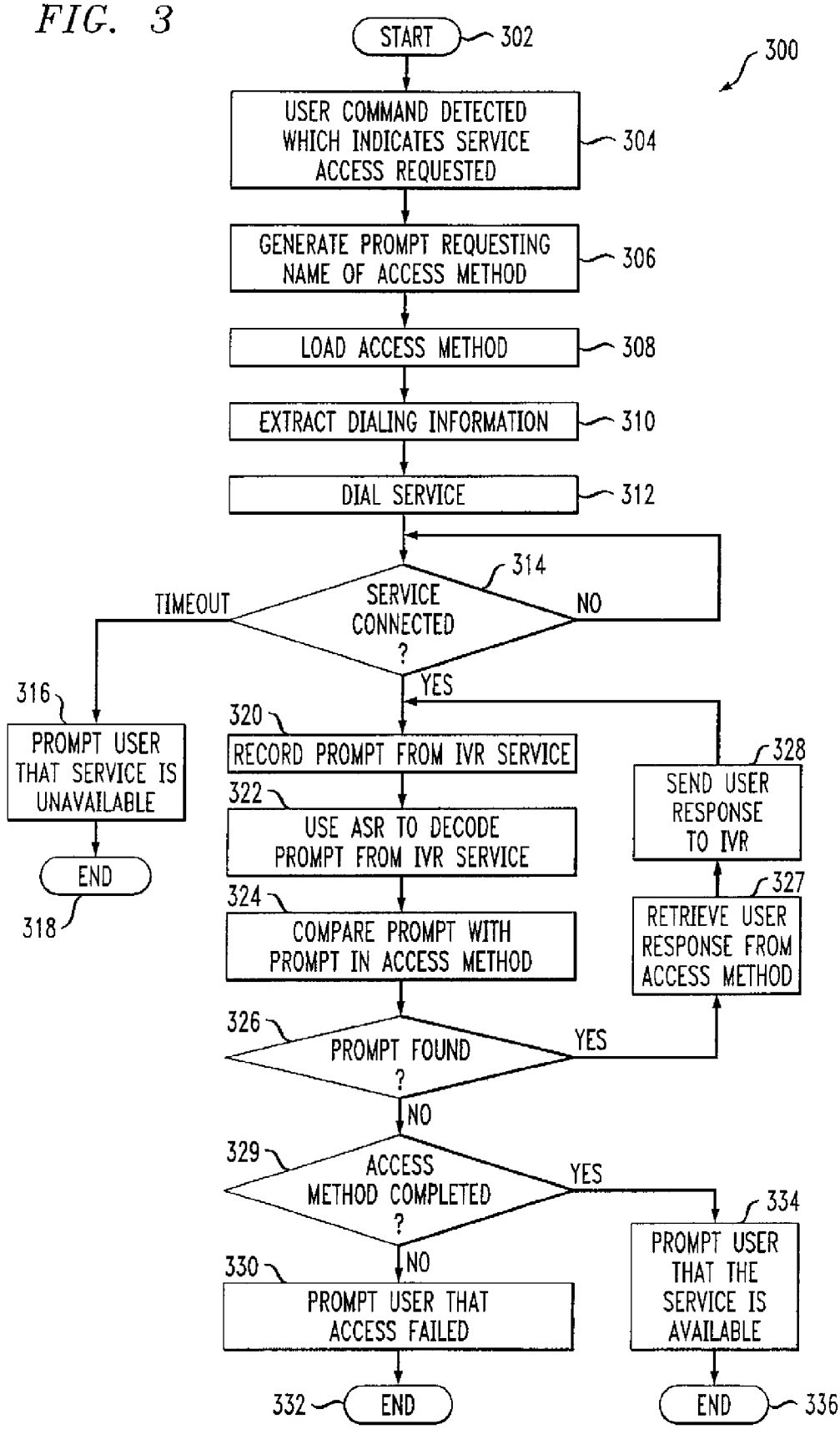
FIG. 3 is a flow diagram illustrating an access process of an automated telephone menu navigation methodology according to an embodiment of the present invention.

Referring now to FIG. 3, a flow diagram illustrates an access process of an automated telephone menu navigation methodology according to an embodiment of the present invention.

Access process 300 begins at block 302. In step 304, the process detects the user command which indicates service access is being requested. In step 306, the process generates a prompt requesting the name of the (previously trained and stored) access method. In step 308, the process retrieves and loads the file for the requested access method.

In step 310, the process extracts the dialing information from the access method file, and dials the service in step 312. In step 314, the process determines whether the user's device has connected to the service. If no, the process iterates step 314 until a connection is made or a timeout period has elapsed. If a timeout is reached, the process prompts the user that the service is unavailable, in step 316. The process would then end at block 318.

If a connection is made, the process records the prompt from the IVR service, in step 320. In step 322, the automatic speech recognition (ASR) component of the system decodes the prompt from the IVR service. In step 324, the process compares the prompt with the prompt in access method. In step 326, the process determines whether the recorded prompt substantially matches the stored prompt (i.e., is prompt found?). If the prompt is found, the process retrieves the user response from the access method, in step 327, and sends the user response to the IVR, in step 328. The process continues to iterate through steps 320 through 328 until no prompt is found.

If no prompt is found, in step 329, the process determines whether the access method is completed. If no, the process prompts the user that access has failed, in step 330. The process would then end at block 332. Otherwise, the process prompts the user that the service is available, in step 334. The access process would then end at block 336.

It is also realized, in accordance with the present invention, that providers of services that use telephone menu systems to provide access to their services may wish to reduce the burden to the user. The principles of the invention may be used by such service providers to achieve such reduced user burden.

In the event that the user has reached the node of a telephone menu that he may wish to visit again, and is training an implementation of the invention to reach such point, a correctly configured telephone menu system may accept an agreed upon DTMF code at any time and, in response, generate a DTMF sequence including appropriate security safeguards, which if replayed at the first prompt will navigate directly to the desired node of the menu. This data could be requested by the software of the invention at the point that the user indicates training completion, and it could be stored in place of the access data described above. Thus, in the case that an IVR has provided a node access code and it has been stored in the user's access method collection, it can be transmitted to the IVR immediately following the connection stage of the access procedure, and if acknowledged by the IVR, the user can be informed that the requested service is available. This is illustrated in the context of FIG. 4.

Figure 4:
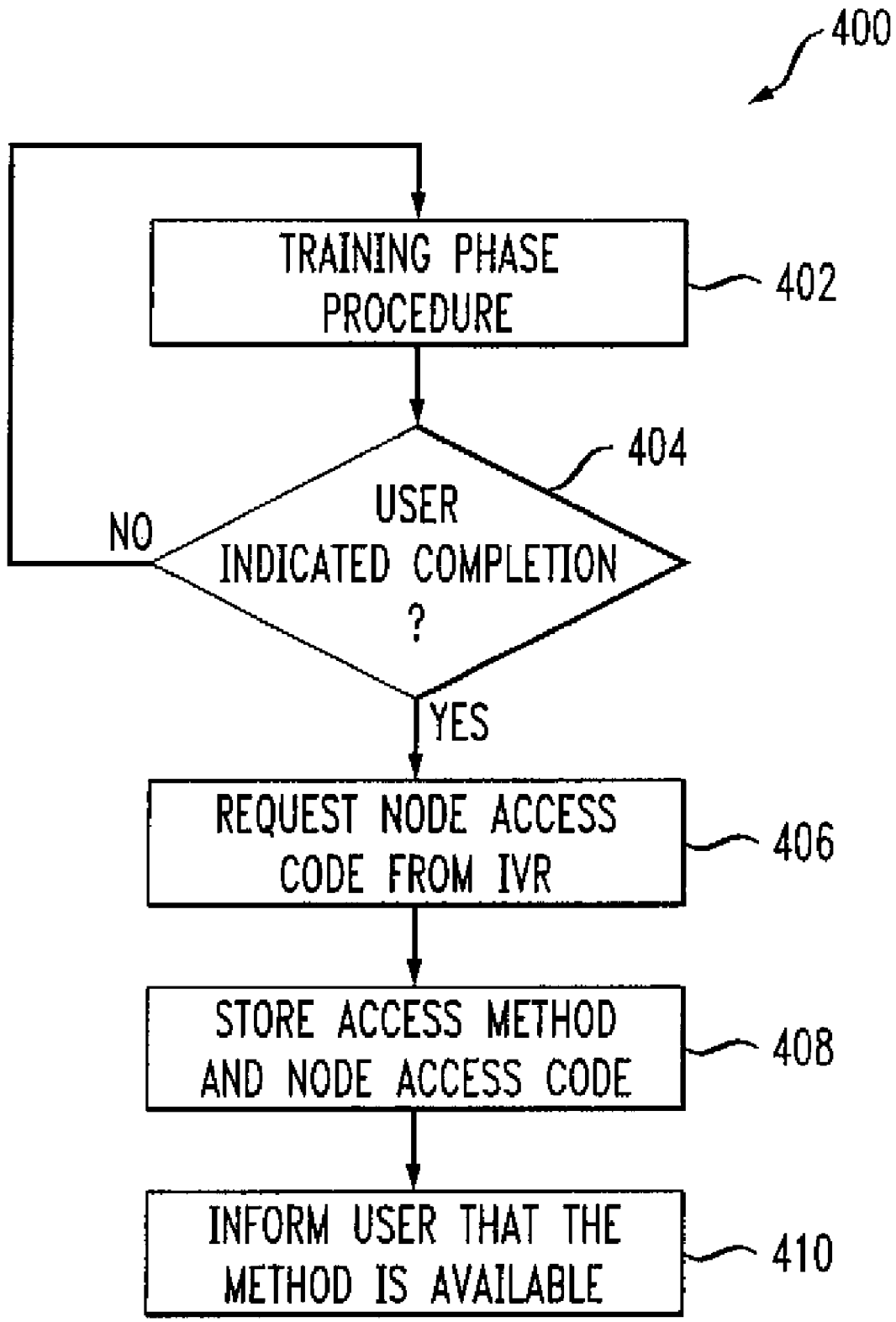
FIG. 4 is a flow diagram illustrating a training process of an automated telephone menu navigation methodology according to another embodiment of the present invention.

Referring lastly to FIG. 4, a flow diagram illustrates a training process of an automated telephone menu navigation methodology according to another embodiment of the present invention.

In step 402, process 400 performs a training phase procedure, for example, the training process described above in the context of FIG. 2. In step 404, process 400 determines whether the user has indicated completion of the training phase. If no, the training phase continues (step 402). If the training phase is complete, process 400 requests a node access code from the IVR. The node access code (e.g., DTMF code) corresponds to the point in the menu that the user has navigated to during the training phase. In step 408, the process stores the access method and node access code. In step 410, process 400 informs user that the method is available.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in automating access to one or more services accessible through a communications system, the method comprising the steps of:
    connecting to the communications system;
    recording one or more actions associated with a user and one or more actions associated with the communications system wherein the actions are performed to effectuate a transaction associated with the communications system;
    recognizing at least a portion of the one or more actions associated with the communications system when the communications system is subsequently connected to; and
    replaying at least a portion of the one or more recorded actions associated with the user such that the user need not perform at least a portion of the one or more recorded actions in order to effectuate the transaction associated with the communication system.

2. The method of claim 1, wherein the communications system comprises a telephone menu system.

3. The method of claim 1, wherein the communications system comprises an interactive voice response system.

4. The method of claim 1, wherein the one or more actions associated with the user comprise providing speech-based input.

5. The method of claim 1, wherein the one or more actions associated with the user comprise providing key press-based input.

6. The method of claim 5, wherein the recording step further comprises recording dual tone multi-frequency data in accordance with the key press-based input.

7. The method of claim 1, wherein the one or more actions associated with the communications system comprise providing a speech-based prompt.

8. The method of claim 7, wherein the recording step further comprises decoding the speech-based prompt.

9. The method of claim 8, wherein the recording step further comprises storing the decoded prompt.

10. The method of claim 1, wherein the recording step further comprises differentiating between one or more actions associated with the user and one or more actions associated with the communications system.

11. The method of claim 1, wherein the recording step further comprises associating a code with the recorded actions such that at least a portion of the one or more actions associated with the user and the one or more actions associated with the communications system are automatically performable or recognizable, respectively, when the code is subsequently provided to the communications system.

12. The method of claim 1, further comprising the step of automatically performing or recognizing, respectively, at least a portion of the one or more actions associated with the user and the one or more actions associated with the communications system when the communications system is subsequently connected to.

13. The method of claim 1, further comprising the step of indicating to the user that access to the one or more services is unavailable.

14. Apparatus for use in automating access to one or more services accessible through a communications system, the apparatus comprising:
    a memory; and
    at least one processor coupled to the memory and operative to: (i) connect with the communications system; (ii) record one or more actions associated with a user and one or more actions associated with the communications system wherein the actions are performed to effectuate a transaction associated with the communications system; (iii) recognize at least a portion of the one or more actions associated with the communications system when the communications system is subsequently connected to; and (iv) replay at least a portion of the one or more recorded actions associated with the user such that the user need not perform at least a portion of the one or more recorded actions in order to effectuate the transaction associated with the communications system.

15. An article of manufacture for use in automating access to one or more services accessible through a communications system, comprising a computer readable storage medium containing one or more programs which when executed implement the steps of:
    connecting with the communications system;
    recording one or more actions associated with a user and one or more actions associated with the communications system wherein the actions are performed to effectuate a transaction associated with the service;
    recognizing at least a portion of the one or more actions associated with the communications system when the communications system is subsequently connected to; and
    replaying at least a portion of the one or more recorded actions associated with the user such that the user need not perform at least a portion of the one or more recorded actions in order to effectuate the transaction associated with the communications system.

* * * * *